United States Patent [19]
Movassaghi

[11] Patent Number: 5,818,931
[45] Date of Patent: Oct. 6, 1998

[54] TELEPHONE LINE ACCESS CONTROL APPARATUS

[76] Inventor: Abdorreza Movassaghi, 1635 N. Rodney Dr. #3, Los Angeles, Calif. 90027

[21] Appl. No.: 789,939

[22] Filed: Jan. 28, 1997

[51] Int. Cl.[6] .............................. H04M 1/00; H04M 3/00; H04M 1/66
[52] U.S. Cl. ........................ 379/445; 379/200; 379/194
[58] Field of Search .................................. 379/445, 188, 379/189, 190, 194, 200

[56] References Cited

U.S. PATENT DOCUMENTS

| | | | |
|---|---|---|---|
| 2,219,444 | 6/1940 | Fewings et al. | 13/39 |
| 4,683,583 | 7/1987 | Kossor | 379/200 |
| 4,975,943 | 12/1990 | Weber et al. | 379/200 |
| 5,559,874 | 9/1996 | Panosh | 379/200 |

Primary Examiner—Jack Chiang
Attorney, Agent, or Firm—Goldstein & Associates

[57] ABSTRACT

A telephone line access control apparatus to restrict access to an outgoing telephone line may be placed in a locked mode to restrict access to the telephone line, or in an unlocked mode to enable full and unrestricted access to the controlled telephone line. The apparatus supports the answering of all incoming calls, and when in the locked mode restricts access to the telephone line by enabling a person to dial only preselected emergency telephone numbers. The invention is configured with a filter, which may be coupled to the telephone line, as required, to restrict the dialing and placing of unauthorized telephone numbers. Another embodiment of the invention is arranged with a plug that may be plugged into a telephone jack in a secured manner so that the apparatus may only be unlocked and removed from the telephone jack by individuals having a key.

17 Claims, 7 Drawing Sheets

TELEPHONE LINE ACCESS CONTROL APPARATUS

BACKGROUND OF THE INVENTION

1. Field Of The Invention

The invention relates generally to telephone apparatus, and more particularly, to an apparatus for controlling and restricting access to a telephone line.

2. Background And Objects Of The Invention

The need to secure telephone lines in order to provide controlled access thereto, is well known in the art. Indeed, there are many mechanical systems that lock telephone connection jacks, restrict an individual from lifting the handset, or restrict access to the phone via a "lockbox" arrangement known in the art. Other systems are known that prevent a user from dialing digits of an outside telephone number (e.g., a phone without a keypad). These systems have several limitations. First, they prevent the use of a phone for placing emergency assistance request calls (i.e., a 911 type call). Also, some known systems do not allow incoming calls from being answered. Accordingly, possibly life saving emergency calls can not be placed and incoming calls that generally will not result in a charge to the callee, can not be answered.

Other systems are known that restrict access to an outgoing line to place outgoing calls by requiring a "password", generally consisting of series of touch tone (DTMF) signals to be entered by the perspective caller. System of this type, although capable of preventing unauthorized outgoing calls, or alternately, prevent outgoing call to be placed by unauthorized persons, have several limitations. First they require the password to be known to place emergency calls, or calls to a known (acceptable) location. Further, one the password is known, unauthorized access to the outside or outgoing line can result if the password is disclosed to other individuals.

When considering the problems and drawbacks of known systems to provide the level of control and functionality desired, there is a need for new and advanced access control apparatus. Objects of the present invention are, therefore, to provide new and improved telephone access arrangements having one or more of the following capabilities, features, and/or characteristics:

- small and self-contained construction;
- restricts the placement of outgoing calls;
- supports the placement of "911", and other emergency outgoing calls;
- a simple apparatus that can be employed with the ubiquitous modular telephone jack;
- provides for secure, locked access to the telephone jack the apparatus is installed in;
- enables incoming calls to be answered;
- key operated locking enables the authorized releasing of the apparatus from the telephone jack; and
- the key operated locking means further enables full access for placing unrestricted outgoing calls.

The above listed objects, advantages, and associated novel features of the present invention, as well as others, will become more clear from the description and figures provided herein. Attention is called to the fact, however, that the drawings are illustrative only. Variations are contemplated as being part of the invention, limited only by the scope of the appended claims.

SUMMARY OF THE INVENTION

In accordance with the invention, an apparatus is provided for controlling access to an outgoing telephone line, possibly accessed by way of a telephone jack. The apparatus may include a plug for connecting the apparatus to the telephone jack resulting in the operative coupling of the apparatus to the line. At least one controlled telephone jack of the apparatus enables the coupling of at least one telephone to the apparatus. Filter means, which is operably coupleable to the telephone line, is provided for reducing the level of signals present on the telephone line below a useful level. Accordingly, if the filter means is coupled to the telephone line, the proper operation of the telephone coupled via a controlled telephone jack is prevented. A ring detector for detecting a ring signal voltage on the telephone line is included to inhibit the coupling of the filter means to the telephone line should the telephone be taken off-hook within a predetermined time interval after the detecting of the ring signal voltage. To enable the calling of emergency, or preselected and known telephone numbers, means are included for determining when the telephone is taken off-hook in the absence of the ring signal for causing the filter means to be coupled to the telephone line should one or more invalid DTMF signals be detected, thereby preventing use of the telephone to dial unacceptable or unauthorized telephone numbers. In addition, mechanical means are provided to enable the apparatus to be plugged into the telephone jack of the outgoing telephone line and secured therein to prevent the unauthorized removal of the apparatus from the telephone jack.

BRIEF DESCRIPTION OF THE DRAWINGS

In the drawings, like elements are depicted by like reference numerals. The drawings are briefly described as follows.

LIST OF REFERENCE NUMERALS USED IN THE DRAWINGS

Figure 1:
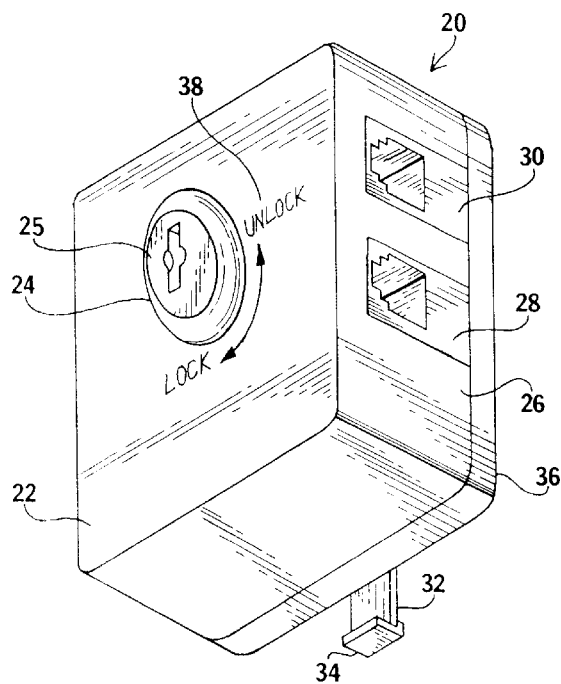
FIG. 1 illustrates a perspective view of an embodiment of an apparatus in accordance with the present invention.

20—telephone jack access control apparatus
20a—filter or filter means

20b—ring detector
20c—control circuitry
20d—DTMF decoder
21—access control module
21a—coupler
21b—comparator
22—front face (of case 23)
23—case (of apparatus)
24—key operated lock (lock and switch means)
25—cylinder
26—side face (of apparatus)
27a—signal (comparator to access control module)
27b—signal (ring detector to access control module)
28, 30—controlled telephone jack
32—slide
34—boss
35a—outgoing (outside) telephone line
35b—controlled telephone line
36—rear face (of case)
38—indicia
40,40'—flanges
42—clips
44,44'—pair of ears
46—telephone plug or plug
48—resilient arm
50—stop
50a—first position of stop
50b—second position of stop
52—slot (in rear face)
54,54'—shoulders
56—outgoing telephone jack
58,58'—tabs
60,66—[conventional] hardware
62—key
64—ring (fixed to cylinder 24)
68—cylinder end or end
70—printed circuit (PC) board
72—(support) standoffs
74,74'—contacts
76—slot (in PC board)
78—second switch (normally closed)
80—arm
80a—first (normal) position of arm
80b—second (actuated) position of arm
100—partial electrical circuit
102,104—(pair of) circuit lines
106,106'—circuit lines (for jack 28)
108,108'—circuit lines (for jack 30)
110—telephone
111—plug (of telephone 110)
112,112'—circuit lines (outgoing telephone line)
116—low pass filter
118—series resistor (of low pass filter)
120—shunt capacitor (of low pass filter)
122—first switch (normally open, part of relay 122/124)
124—coil (of relay 122/124)
122,124 —relay (comprised of 122 and 124)
126—diode bridge
130—first tap node (ground reference)
132—second tap node
134—ground (zero volt) reference
136—voltage regulator
136a—battery
138—resistor
140—zener diode
142—transistor
144—resistor
146—capacitor
150—biasing voltage
152—handset (of telephone 110)
152a—on-hook position (on-hook condition)
152b—off-hook position (off-hook condition)
154—zener diode
156—voltage divider
158—resistor (part of voltage divider 156)
160—resistor (part of voltage divider 156)
162—zener diode
164—NAND gate (inverter)
166—capacitor
168—(ring signal) detector
170—diode
172—capacitor
174—resistor
176—resistor
178—capacitor
180—NAND gate (part of flip-flop)
184—NAND gate (part of flip-flop)
186—NAND gate
188—switch transistor
190—
192—output of gate 184, inputs of gates 186 and 180
194—output of gate 180, input of gate 184
196—output of gate 164, input of gate 184
220—alternate embodiment of the apparatus 20
223—front face (of apparatus 220)
224—support means
228,230—controlled telephone jacks (of apparatus 220)
236,236'—screw terminals
270—printed circuit board (of apparatus 220)

DETAILED DESCRIPTION OF THE PREFERRED EMBODIMENTS

Referring now to FIG. 1, there is illustrated a perspective view of an embodiment of a telephone jack access control apparatus 20, in accordance with the present invention. Shown is a case 23 that in a preferred embodiment would be provided as a molded case composed of plastic, alloy, or the like. The case includes a front face 22, which may have disposed therein a key operated lock 24 with a cylinder 25. Accessed via a side face 26 are one or more controlled telephone jacks, shown as 28 and 30. The controlled telephone jacks, which may be termed an electro-mechanical telephone jack, may be located in positions other that shown in FIG. 1. As will be discussed below in more detail, the jacks 28 and 30 are termed "controlled telephone jacks" because the access to the associated outgoing (or outside) telephone line is controlled in accordance with the invention so that generalized outgoing "unauthorized" telephone calls may be prevented. Also shown in FIG. 1 is a slide 32 ending with a boss 34. The slide 32 (and boss) protrudes from the rear face 36 of the case 23. The functions of the slide 32 and the key operated lock 24 will be addressed in greater detail below.

Figure 2:
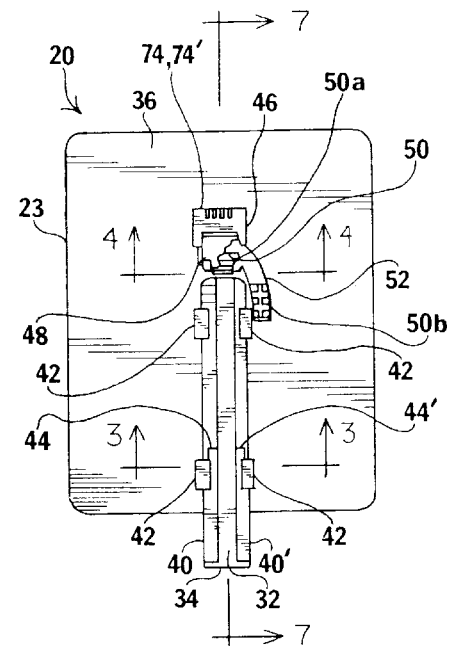
FIG. 2 is a rear view depiction of the embodiment of FIG. 1.

FIG. 2 provides a rear view of the telephone jack access control apparatus 20 of FIG. 1. Clearly shown are the slide 32 and two flanges 40 and 40', which slide underneath four clips 42, which may be molded into the rear face 36, or attached by suitable means. As shown, the slide is maintained in a normal (inactivated) position by a pair of ears 44 and 44', which abut the lower pair of clips 42 and 42', respectively. It should be understood that the arrangement provided in FIG. 2, including the slide 32, the clips 42, the ears 44/44', etc., are illustrative only. Those skilled in the art will appreciate the variety of other arrangements that may be provided to yield the same (or equivalent) functionality.

Figure 5:
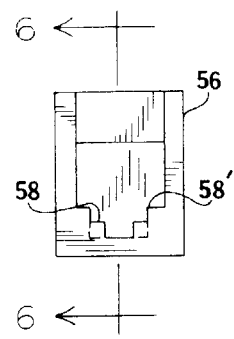
FIG. 5 depicts a front view of a modular telephone jack.
Figure 7:
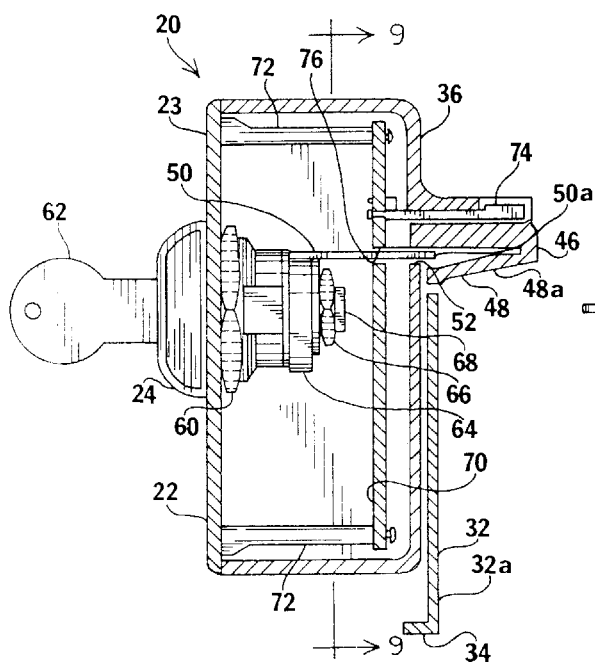
FIGS. 7 and 8 provide sectional views of the embodiment of the apparatus of FIGS. 1 and 2, taken along the line 7—7 of FIG. 2.

As shown in FIG. 2, a telephone plug 46 extents from the rear face 36 of the case 23. As such, the plug may be mounted and fixed to the case, or in a preferred embodiment, molded into (i.e. formed in part as a portion of) the rear face 36 of the case 23. Molded or suitably fixed to the underside or bottom of the plug 36 is a resilient arm 48, which is partially cut away to show a stop 50 that is coupled to the cylinder 25 of the key operated lock 24 (of FIG. 1). The stop 50 moves with the rotation of the cylinder 25 within a curved slot 52 in the rear face 36. As provided in FIG. 1, indicia 38 may be provided to indicate the direction of rotation and the position the cylinder 25 must be placed in for the apparatus 20 to be put in an "unlocked" mode or a "locked" mode. Accordingly, the cylinder 25 and the stop 50 may be rotated between a first or locked position 50a, and a second or unlocked position 50b. The stop is provided to prevent the unauthorized (or undesired) release of the telephone jack access control apparatus 20 from a telephone wall jack (such as the telephone jack shown in FIG. 5) in which the apparatus may be installed in. As such, with the cylinder 25 in the locked position, the unauthorized removal of the apparatus 20 is prevented. The removal of the apparatus 20 being possible by use of a key 62 (as shown in FIG. 7) employed to rotate the cylinder 25 from the first position 50a to the second position 50b. Once rotated into the second position 50b, the slide 32 may then be utilized to move and displace the resilient arm 48 from a first position 48a (retaining the apparatus 20 in a telephone jack to be controlled) to a second position 48b (to release the apparatus 20 from said jack).

Figure 3:
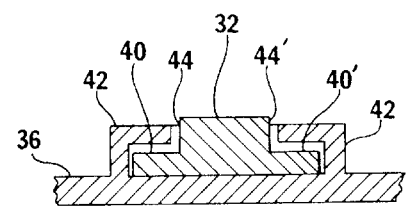
FIGS. 3 provides a sectional view along the line 3—3 of FIG. 2.

Turning now to FIG. 3, there is provided a sectional view along the line 3—3 of FIG. 2 that illustrates the cooperating relationship of the slide 32 (including the flanges 40 and 40'), the plurality of clips 42, the ears 44 and 44', and the rear face 36. Clearly shown is the manner in which the clips 42 provide for the slideable mounting of the slide 32 via the flanges 40 and 40'.

Figure 4:
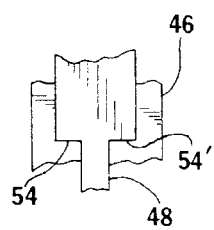
FIG. 4 is a sectional view along the line 4—4 of FIG. 2
Figure 6:
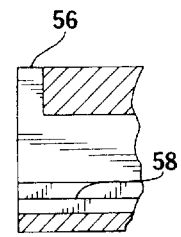
FIG. 6 provides a sectional view along the line 6—6 of FIG. 5

FIG. 4 provides a view along the line 4—4 of FIG. 2, showing a portion of the telephone plug 46 and the resilient are 48. As illustrated, the resilient arm 48 may be arranged with a pair of shoulders 54 and 54' that are urged by the resilient arm 48 to abut tabs (such as the tabs 58 and 58' of FIG. 5) found inside a typical modular telephone jack. The tabs 58 and 58' are further illustrated in FIG. 6, which is a sectional view along line 6—6 of FIG. 5. The design of a telephone plug 46, similar to that shown in FIGS. 2 and 7, including the resilient arm 48, shoulders 54 and 54', and a corresponding mating telephone jack 56 (with its tabs 58/58') are well known in the art. A feature provided with the present invention, which will be addressed further in significant detail below, is the ability to unlock via the key operated lock 24 the apparatus 20 both in an electrical sense and in a mechanical sense. That is, the key operated lock 24 simultaneously enables the apparatus 20 to be electrically defeated, while mechanically enabling the slide 32 to be employed to release the apparatus 20 from a telephone jack the apparatus may be installed in. The above arrangement including the plug 46, the contacts 74 and 74', the resilient arm 48, and the slide 32, may be termed a mechanical means to enable the plug to be plugged into an outgoing telephone jack to appropriately couple (and possibly secure) the apparatus to the outgoing telephone line, and further may be termed a means that is responsive to the key operated lock for presenting the removal of the apparatus 20 from telephone jack 56.

Figure 8:
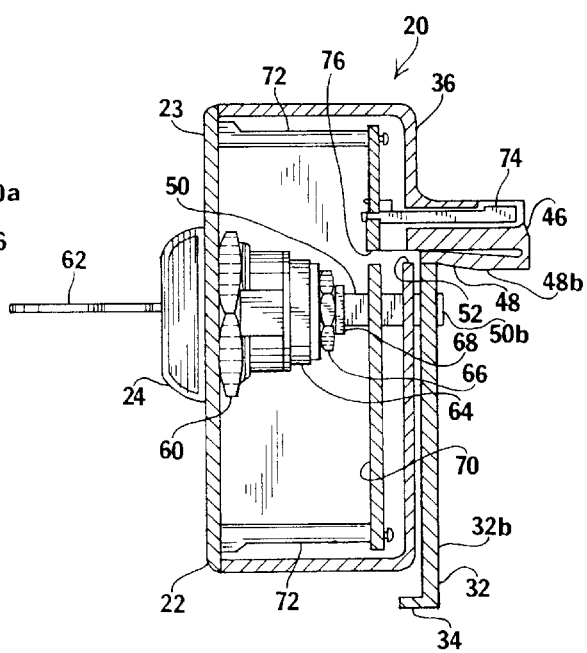

Referring now to FIG. 7, there is provided a sectional view along the line 7—7 of FIG. 2. As shown, the key operated lock 24 and a printed circuit board 70 (supported via standoffs 72) are suitably mounted to locate the stop 50 to pass through a slot 76 in the printed circuit (PC) board. The stop 50 is fixed at the circumference of a ring 64, for example, using conventional hardware 66 at end 68 of the cylinder 25. With the stop 50 positioned as shown in FIG. 7 (i.e., in position 50a), the stop 50 prevents the movement of the resilient arm 48 from the current first position 48a to a second possible position 48b, and slide 32 is maintained in the position 32a. Accordingly, with the stop positioned as shown in FIG. 7, the apparatus 20 can not be easily removed from a telephone jack (such as telephone jack 56 of FIG. 5) the apparatus is installed in. Further, access to the telephone jack may be functionally and electrically controlled in accordance with the disclosed features and capabilities of the present invention. Should the stop 50 be moved (rotated) from position 50a to position 50b, as shown in FIG. 8, the movement of the resilient arm 48 from the first position 48a to a second possible position 48b is possible by a person displacing the slide 32 from its "normal" position 32a to a depressed position 32b. Accordingly, with the stop positioned as shown in FIG. 8, the apparatus 20 can be easily removed from the telephone jack the apparatus is installed in.

Figure 12:
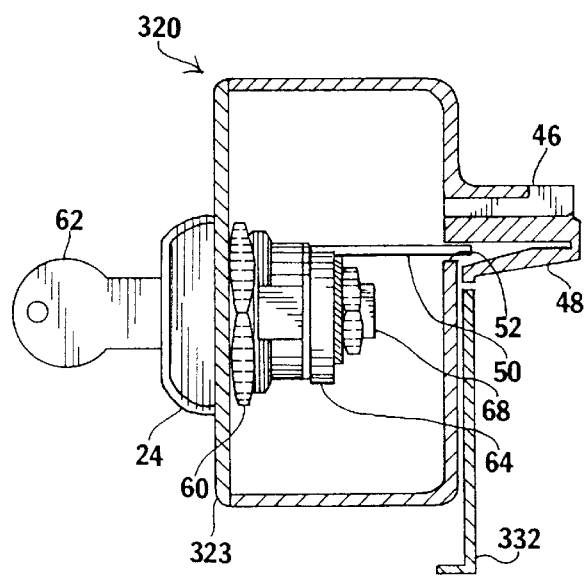
FIG. 12 depicts a sectional view, similar to the view of FIG. 7, in accordance with yet another embodiment of the invention.

An apparatus 320 having a case designated 332 that may be arranged as the mechanical equivalent to that of FIG. 7, is illustrated in FIG. 12. The key 62 may be inserted into the cylinder 25 to enable an individual to rotate the cylinder 25, to move the stop 50 from the first position 50a to the second position 50b. Accordingly, when the stop 50 is located in position 50b, the resilient arm 48 can be moved from position 48a to position 48b (via as shorted version of the slide, designated 332), thereby enabling the release and removal of the plus 46 from the telephone jack the apparatus 20 is installed in and restricting access thereto. As such, the apparatus 330 differs from the apparatus 20 in not having any electrical circuit 100 or printed circuit board 70. The apparatus 320 is contemplated to prevent access to a telephone jack which is not to be utilized. Accordingly, the apparatus 320 prevents a person from moving a telephone plugged into the apparatus 20 via one of the controlled telephone jacks 28 or 30, and plugging the telephone into an unused/nearby telephone jack.

It must be noted that the embodiments and arrangements provided in FIGS. 1, 2, 7, 8, and 12 are illustrative only. Skilled persons may provide modifications and additions which supply the same essential functionality via alternate architectures and arrangements. All such modifications are contemplated as being within the scope of the present invention. This is especially true of systems combining a mechanical "locking" arrangement and other electrical "filtering" functions to limit and control access to one or more telephone lines accessed via telephone jacks.

Figure 9:
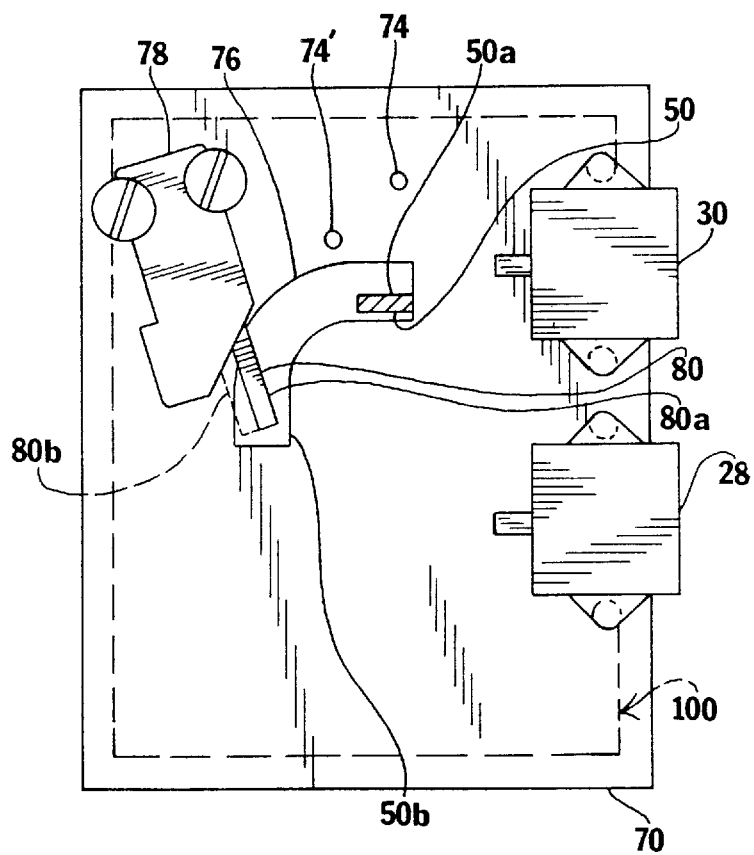
FIG. 9 is a plan view of an embodiment of a circuit board arrangement of the apparatus as taken along the line 9—9 of FIG. 7.

Turning now to FIG. 9, there is illustrated a partial view of the printed circuit (PC) board 70 taken along the line 9—9 of FIG. 7. Clearly shown is the slot 76, an end view of the stop 50 in position 50a, two controlled telephone jacks 28 and 30, and a second (normally closed) switch 78. The second switch 78, which is suitably mounted to the PC board 70, may be configured with an arm 80 to cause the switch 78 to be actuated by the movement of the stop 50 to and from the position 50b. Accordingly, if the stop 50 is in position 50a, the second switch 78 is in its normal position, and is closed. If the stop is placed in position 50b by a user employing key 62 to appropriately rotate the cylinder 25, the arm 80 of switch 78 is moved from a first position 80a to a second position 80b. When the arm 80 is moved into the position 80b, the switch is actuated from its normally closed position (at 80a) to an open position.

The electro-mechanical arrangement described herein and provided in FIG. 9 by the second switch 78, the arm 80, the slot 76, and stop 50, enables the apparatus 20 to be "unlocked" by the simple rotation of the cylinder 25 of the key operated lock 24. The unlocking is provided from both a mechanical standpoint (as the apparatus 20 may be removed from the associated telephone jack it is installed in) and from an electrical standpoint (as the telephone line may now be fully accessed supporting unrestricted usage). The function of the second switch 78 will be addressed in greater detail when referring to FIG. 10C. Also depicted in FIG. 9 is an electrical circuit (not shown) enclosed within the phantom line 100. Various embodiments of suitable circuits that may be utilized with the present invention will be discussed when referring to FIGS. 10A, 10B and 10C. A plurality of telephone plug contacts 74 (of FIGS. 7 and 8), which are designated 74 and 74' in FIG. 9, are coupled to the circuit 100 on the PC board 70. The contacts 74 and 74' are included to electrically and operatively couple a telephone that is to be coupled of interfaced to the circuit 100 of the apparatus 20 (via jacks 28 or 30). Although not illustrated it can be assumed that contacts similar to 74 and 74' are provided with controlled telephone jacks 28 and 30. Therefore, the contacts 74 enable the apparatus to be operatively coupled to the outgoing telephone line, designated 35a in FIG. 10A.

Figure 10:
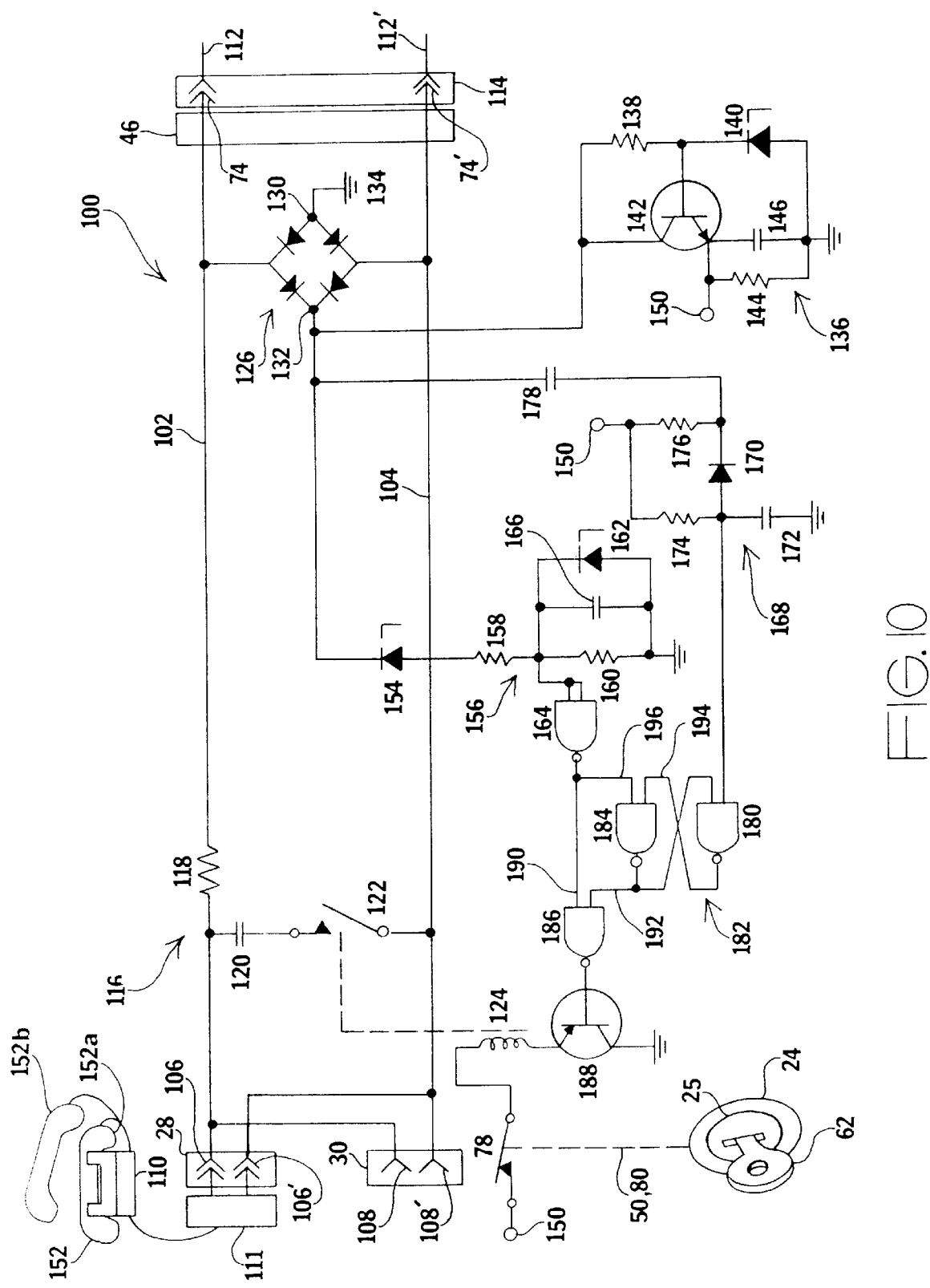
FIG. 10A depicts a high level block diagram of the major circuit modules of the apparatus.
FIG. 10B is a more detailed block diagram of the embodiment of FIG. 10A.
FIG. 10C illustrates a partial schematic diagram for an embodiment of the present invention.
Figure 10A:
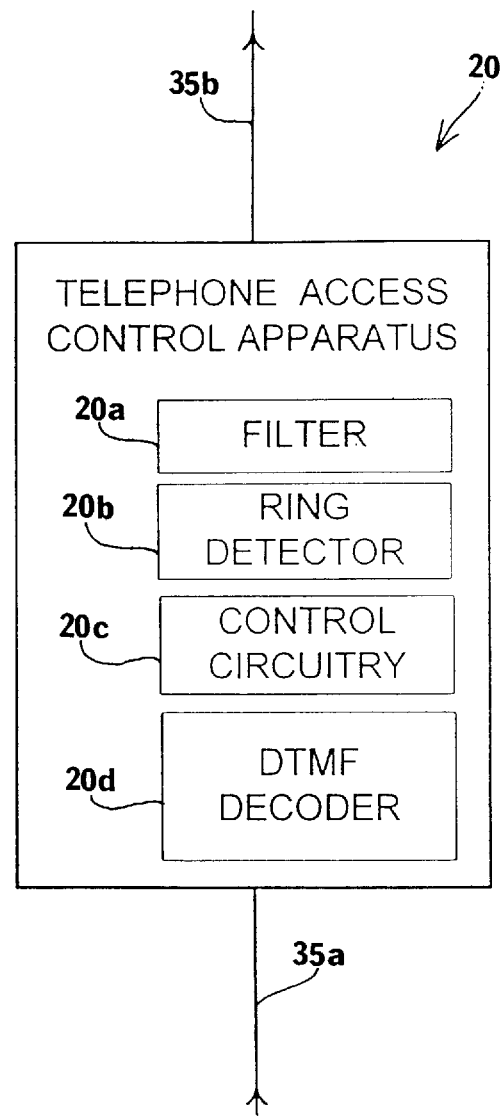

Referring now to FIG. 10A, there is provided a high level block diagram of a plurality of important (circuit) modules that may be included with an embodiment of the apparatus 20. A filter 20a, which may be termed a filter means or low pass filter, is suitably coupled to the outgoing telephone line 35a as required for the proper operation of the apparatus. When coupled to the telephone line the filter 20a appropriately reduces the level, or amplitude, of signals present on the telephone line below a useful level. The phrase "below a useful level" is to be defined as indicating that the signal level/amplitude is reduced below the response or operating level of at least one of the (controlled) telephone (e.g., telephone 110 of FIG. 10A) and the equipment of the telephone service provider accessed via the outgoing telephone line 35a. Accordingly, the amplitude of one or more signals present on the outgoing and/or controlled telephone lines is reduced (due to the coupling of the filter 20a thereto), to prevent or block the proper operation of the telephone 110. For example, if the filter 20a is coupled to the telephone lines 35a/35b, and an individual attempts to use a telephone connected to the apparatus 20 (say via telephone jacks 28 and 30 of FIG. 9), the dial tone provided by the local telephone service provider would be reduced to a level below the operable level of the telephone. Further, the filter 20a would prevent dual-tone multi-frequency (DTMF) signals from being properly received by the telephone service provider's equipment. As will be discussed below, the filter 20a will be arranged to be selectively coupled to and uncoupled from the telephone lines 35a, as required for the proper operation of the apparatus 20.

Further shown in FIG. 10A, is a ring detector 20a that may be provided to detect an incoming telephone call, and subsequently enable an individual to answer the incoming call. This feature would require the apparatus 20 to detect the incoming call by detecting the ring signal voltage present on the telephone line 35a, and inhibit the coupling of the filter 20a to the telephone line 35a should the telephone 110 be taken off-hook within a predetermined time interval after the detecting of the ring signal. For example, if the apparatus 20 detects the ring signal, the circuit 100 may be configured to provide three seconds (measured from, say, the end of a ring signal voltage occurrence), for a person to take the controlled telephone 110 off-hook. If the telephone is taken off-hook during the three second interval provided, the coupling of the filter 20a to the telephone line is inhibited or blocked, thereby enabling the incoming call to be answered. Should the telephone not be taken off-hook within the allowed time period, access to the outgoing telephone line 35a is prevented.

FIG. 10A also includes control circuitry 20c to support operational features of the apparatus 20. For example, once the ring detector 20b detects an incoming call, the control circuitry 20c may be arranged to electrically uncouple the filter 20a from the associated telephone line. It should be noted that the control circuitry 20c may be provided by known programmable single chip microcomputers and additional required analog/digital circuitry. Alternately, the control circuitry may be provided by a circuit provided by discrete components including digital SSI, MSI, and LSI gates, along with the required resistors, capacitors, etc. A variety of embodiments of the control circuitry 20c, and equivalents, may be provided by skilled individuals. The function of DTMF decoder 20d will be addressed below while referring to FIG. 10B.

Figure 10B:
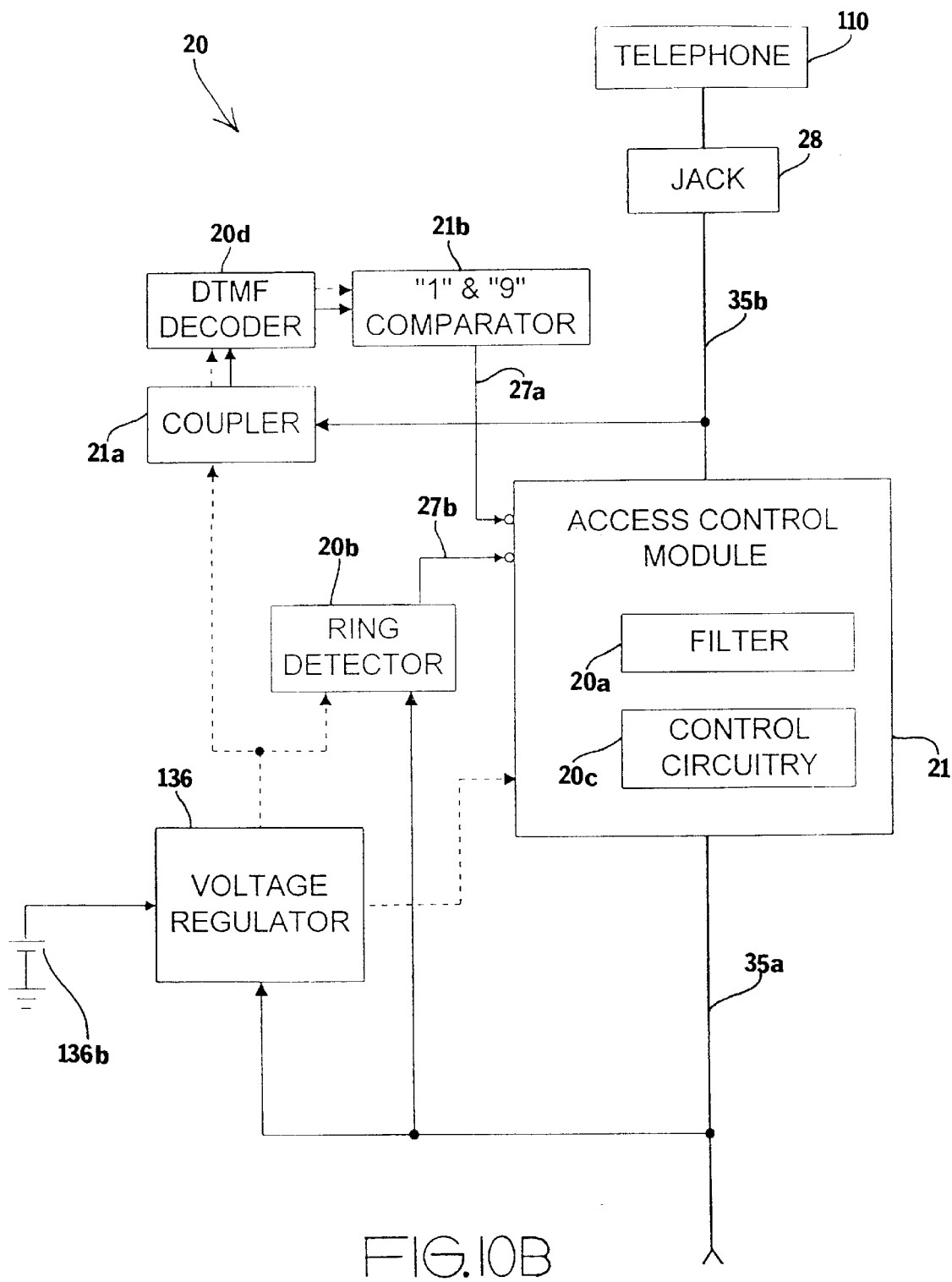

Turning now to FIG. 10B, a more detailed block diagram of the embodiment of FIG. 10A is provided. Shown is the outgoing (or outside) telephone line 35a coupled to an access control module 21, which includes the filter 20a and control circuitry 20c. Means for supporting the coupling of the apparatus to the outgoing telephone line may be provided by the plug/jack arrangement discussed above, or a hardwired arrangement as will be addressed below when referring to FIG. 11. The ring detector 20b is arranged to monitor the outgoing telephone line 35a to detect a ring signal voltage, indicating an incoming call. It should be noted that the outgoing telephone line 35a may be distinguished from the controlled telephone line 35b in that the filter 20a may be disposed therebetween. The operation of the apparatus 20 and the filter 20a, will be discussed in greater detail when referring to the FIG. 10C. If an incoming call is detected, the ring detector provides a signal 27b to indicate the ring signal presence to the access control module 21. The filter may then be uncoupled (or remain uncoupled) from the telephone lines 35a/35b to enable a person to answer the telephone. FIG. 10B may also include a coupler 21a to operatively couple to the telephone line 35b, as illustrated, or alternately the outgoing telephone line 35a (connection not shown). The coupler 21a may be included to enable the coded digit values of the DTMF signals or tones to be determined by a DTMF decoder 21d. If the detected DTMF signals (having appropriate coded digit values) match known, preselected, and acceptable digit values of emergency telephone number DTMF tones, for example "9-1-1" tones, a signal 27a may be provided by a comparator 21b to indicate to the access control module 21 (i.e. the control circuitry 20c) that the filter 20a should remain uncoupled from the telephone line, enabling the tones to be transmitted to, and received by, the equipment of the telephone service provider. If a detected DTMF signal is not a preselected and valid "emergency tone" (e.g., a 9 or a 1 tone), then the filter 20a is coupled to the telephone lines 35a/35b. If the local emergency number is 9-1-1, then as shown the 1 & 9 comparator 21b may be employed to determine when the emergency number is being dialed. It should be noted that the coupler 21a, the DTMF decoder 20d, and the comparator 21b, may be said to comprise a means to determine when the telephone is taken off-hook in the absence of the ring signal for causing the filter means to be coupled to the telephone line should an invalid or unacceptable DTMF signal be detected.

It should be noted that it is contemplated that the apparatus 20 may be embodied to further enable one or more preselected telephone numbers to be dialed. If such a (preselected) telephone number is dialed, the apparatus may be arranged to permit the call to be placed. For example, assume such a preselected telephone number is the telephone number of the owner of the house or building the apparatus 20 is installed in. A feature that may be supported by an embodiment of the apparatus 20 would be the determining and storing of the valid digits of a telephone number that may be dialed without coupling the filter to the telephone lines 35a/35b. Such an arrangement could be implemented using available single chip microcontrollers, keypads, displays, comparators, dip-switches, and the like, all of which are well known to skilled individuals.

Further included in FIG. 10B is a voltage regulator 136 (possibly including filtering circuits) that may be included to provide operating power to various modules and components of the apparatus 20. As shown, the voltage regulator 136 may be coupled to the outgoing telephone line 35a to receive telephone line voltages that may be rectified and filtered to provide a regulated DC operating voltage to the apparatus 20. Alternately, the apparatus 20 may be powered by a battery 136b, or other available power sources (not shown), as required.

Turning now to FIG. 10C, there is illustrated a partial schematic diagram for an embodiment of the electrical circuit 100 of the present invention. The electrical circuit 100, introduced when referring to FIG. 9, is realized as a printed circuit disposed on the PC board 70 and including (in the embodiment of FIG. 10C) a variety of discrete circuit components. It should be noted that this embodiment is provided for use with the common ring-tip service line, sometimes referred to as plain old telephone service (POTS). Further the circuit provided in FIG. 10C is a partial circuit providing an illustrative example of a partial implementation of the apparatus 20. As shown in FIG. 10C, a first pair of circuit lines 102 and 104, which provide access to the outgoing telephone line 35a, connect to the contacts 74 and 74'b of the plug 46 (of FIGS. 2, 7, and 8). The outgoing telephone line 35a is depicted as provided by lines 112 and 112' and accessed via plug 114, to which the apparatus 20 may be connected by the plug 46 (shown in FIG. 2, 7, and 8). Also shown is a second pair of circuit lines 106 and 106' of jack 28 and circuit lines 108 and 108' of jack 30. A telephone 110, shown plugged into jack 28, may have been connected to either jack 28 or jack 30. A series resistor 118 and a shunt capacitor 120 provide a low pass filter 116. The low pass filter 116 may be considered the equivalent of the filter 20a, or a generic filter means, as discussed above. A first switch 122, which is a normally open switch, is included to selectively couple the capacitor 122 across the pair of circuit lines 106 and 106' (and 108 and 108'). It should be noted that the first switch 122 and a coil 124 may be provided by a relay, and the relay will be designated 122/124. The relay 122/124 may be provided by well known off-the-shelf reed relays. It should further be noted that the filter 20a (e.g. low pass filter 116), is coupled to the circuit lines 102 and 104 (or equivalently 106 and 106a) when the first switch 122 is closed. When the first switch 122 is closed the filter, or equivalently the filter means, is disposed so as to be operatively coupled between the circuit lines. Accordingly, when the first switch 122 is closed and the filter is coupled to the lines, the amplitude of one or more signals present on the circuit lines 102 and 104 (or possibly 106 and 106'), are reduced below a useful level. The term "below a useful level" will be defined as indicating below a level recognized by the equipment of the telephone service provider and/or the telephone 110.

The typical telephone line 35a voltage level with the handset 152 of the telephone 110 in the on-hook position 152a is approximately 45 to 55 volts DC. If the handset is lifted and taken-off hook, as indicated by off-hook position 152b, the telephone line voltage drops to approximately 6 to 20 volts (due to loading by the circuits of the telephone 110), and may be termed a reduced voltage level. The DC voltage present, regardless of whether it is the higher DC level, or the reduced (off-hook) DC level, is filtered and regulated by a voltage regulator 136. The regulator 136 may be comprised of a transistor 142, a voltage establishing series combination of resistor 138 and zener diode 140, and an emitter coupled parallel combination comprising resistor 144 and capacitor 146. The arrangement illustrated for regulator 136 is one of a number known by skilled individuals. Accordingly, regardless of the specific power regulation and filtering circuit employed with apparatus 20, a biasing voltage 150 is generated to supply bias and operating power to the various modules and components of the apparatus 20.

A diode bridge 126 is provided that has a first tap node 130 and a second tap node 132. By connecting the first tap node 130 to ground 134 (i.e., a zero voltage reference point), the telephone line voltages are made available at the second tap node 132 (with respect to the ground 134). The second tap node is then coupled to the voltage regulator 136 and further to a detector 168 and a control circuit (which are the equivalents of the ring detector 20b and the control circuitry 20c of FIG. 10A, respectively). An embodiment of the circuit components that provide these functions, as provided in FIG. 10C, will now be discussed.

A ring signal provided by a telephone service provider typically is a 100 volt peak-to-peak signal referenced to a 50 volt DC level. The ring signal has a frequency in the range of about 15 to 50 Hertz. The signal is often presented in repeating cycles of about one second on and two to five seconds off. The presence of a ring signal is detected by a detector 168 comprised of a diode 170, a capacitor 172, and resistors 174 and 176. These circuit components enable the detection the ring signal as presented by the telephone service provider on lines 102 and 104. The series capacitor 178 decouples the detector 168 from the DC level present of the telephone line. If a ring signal is not present, the lower input of NAND gate 180 will be high. If a ring signal is detected by detector 168, the lower input of NAND gate 180 goes low. A flip-flop 182 may be provided by the pair of cross coupled NAND gates 180 and 184, as shown. A NAND gate 164, which is configured as an inverter, and the flip-flop 182, provide inputs to a fourth NAND gate 186. NAND gate 186 drives a transistor switch 188 so that when the output of NAND gate 186 is low (and the key operated lock 24 is "locked" with the second switch 78 closed) the coil 124 of the relay 122/124 is energized, thereby closing the first switch 122 and coupling the filter means to the telephone lines. Accordingly, when the output of NAND gate 186 is low, the apparatus reduces the amplitude of one or more signals present on the circuit lines 102 and 104 (or 106 and 106') to a level that is below a useful level. If the second switch 78 is in the "unlocked" position 50b, then the apparatus 20 is electrically disabled as the normally open first switch 122 can not be closed by turning-on and saturating the transistor switch 188. As will be immediately discussed, if the second switch 78 is closed (via arm 80 and stop 50), the presence of a ring signal will prevent the low pass filter 116 from being coupled to the telephone lines (when the handset 152 is on-hook in position 152a). And further, if the handset is placed in the off-hook position 152b, and no ring signal is present, the low pass filter 116 will be coupled to the telephone line and outgoing calls will be prevented. Although not shown in FIG. 10C, the DTMF decoder and comparator arrangement of FIG. 10B may be provided to enable acceptable telephone numbers (having valid DTMF signal tones) to be dialed without coupling the low pass filter 116 to the telephone lines.

In the on-hook position 152a, which may also be termed an on-hook condition, the input to the NAND gate 164 is provided as a high level signal from a voltage divider 156 comprised of resistors 158 and 160. This high level is presented as a low level via the output of NAND gate 164, thereby preventing the transistor switch 188 from turning on (and coupling the filter to the telephone line). The voltage divider 156 is coupled to the second tap 132 of the diode bridge (rectifier) 126 via a zener diode 154. In the on-hook condition the voltage is at a sufficient level to cause zener diode 154 to breakdown and provide the required current flow to establish the needed high level voltage at the input of NAND gate 164. In the off-hook position 152b, which may be termed an off-hook condition, the loaded voltage of the telephone line is too low to cause the breakdown of the zener diode 154. Accordingly, the voltage presented to the input of NAND gate 164 is low. At this point, assuming no ring signal is present, both inputs to the NAND gate 186, 190 and 192 respectively, are high, and the transistor switch 188 is on/conducting. If the apparatus 20 is in the locked mode resulting in the second switch 78 being closed, the coil 124 of the relay 122/124 is energized and first switch 122 is closed. Thus, the low pass filter 116 will be coupled to the telephone line (e.g., across the circuit lines 102 and 104) and outgoing DTMF signal tones may be essentially blocked.

Consider again, the on-hook condition 152a in which the input 190 of the NAND gate 186 is low and input 192 is high. Should a ring signal voltage now be detected by detector 168, a low is presented to the lower input of the NAND gate 180 forcing the input 194 of the NAND gate 184 to go high. If subsequently to 194 going high, the handset 152 is lifted (causing an off-hook condition 152b), the resulting high level at the output NAND gate 164, when combined with the high level at 194, produces a low at 192. The low at 192 prevents the transistor switch 188 from conducting, and the incoming call can be answered. Thus, the presence of a ring signal voltage, when the telephone 110 is placed in an off-hook condition, prevents the filter from being coupled to the circuit lines 102 and 104.

As addressed above when referring to FIG. 9, when the cylinder 25 is rotated to place the stop 50 is position 50b, arm 80 of the second switch 78 is moved to the 80b position. Accordingly, the normally closed second switch 78 is opened, thereby preventing any current flow through the coil 124, and further preventing the first switch 122 from being closed. As such, the key operated lock 24 may be provided to place the apparatus 20 in an unlocked mode (filter defeated) or locked mode (filter coupleable), as desired by an operator/owner of the apparatus.

Figure 11:
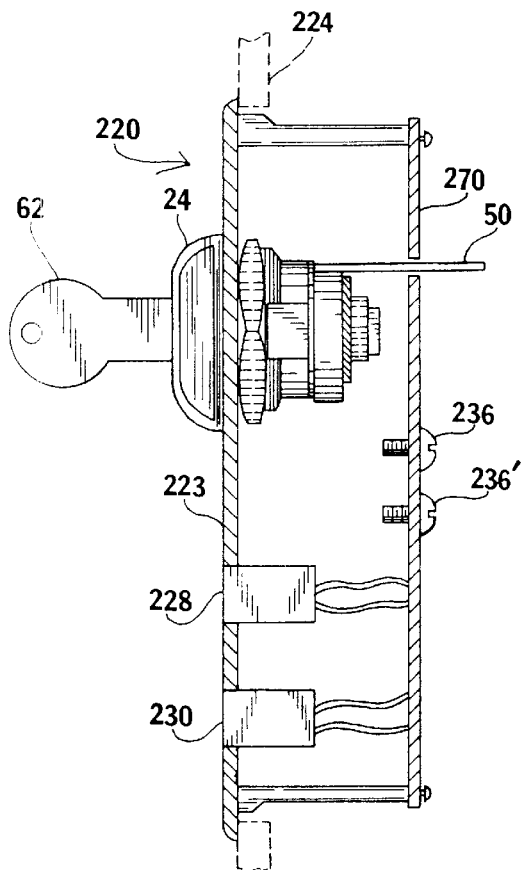
FIG. 11 is a sectional side view of another embodiment of the invention.

Referring now to FIG. 11, a sectional side view of an alternate embodiment 220 of the invention is illustrated. The apparatus 220, which may be considered the electrical equivalent (from a functional perspective) of apparatus 20, is arranged to be suitably mounted and fixed to a support means 224 and permanently "hardwired" to the outgoing telephone line 35a. The support means 224 may be a floor, a wall, a partition, or the like. The embodiment 220 is provided with a front face 223, a printed circuit (PC) board 270, and a pair of screw terminals 236 and 236'. The front face supports and provides access to the controlled telephone jacks 228 and 230 of the apparatus, while the (PC) board 270 contains the pair of screw terminals 236 and 236', which support the hardwiring of the outgoing telephone line 35a to the apparatus 220. As with the apparatus 20, the key operated lock 24 is provided to place the apparatus 220 in a locked mode (restricting access to the outgoing telephone 35a) or an unlocked mode (providing full access and use of the outgoing telephone line).

The architectural and operational embodiments described herein are exemplary of a plurality possible to provide the same (or equivalent) general system operation and features. Therefore, while there have been described the currently preferred embodiments of the present invention, those skilled in the art will recognize that other and further modifications may be made without departing from the present invention, and it is intended to claim all modifications and variations as fall within the scope of the invention.

What is claimed is:

1. An apparatus for controlling access to an outgoing telephone line, the apparatus comprising:
    (a) means for operatively coupling the apparatus to the telephone line;
    (b) at least one controlled telephone jack, each controlled telephone jack supporting the coupling of at least one telephone to the apparatus;
    (c) filter means operably coupleable to the telephone line for reducing the level of signals present on the telephone line below a useful level, the filter means thereby preventing the proper operation of the telephone;
    (d) a ring detector for detecting a ring signal voltage on the telephone line and inhibiting the coupling of the filter means to the telephone line should the telephone be taken off-hook within a predetermined time interval after the detecting of the ring signal;
    (e) means to determine when the telephone is taken off-hook in the absence of the ring signal for causing the filter means to be coupled to the telephone line should an invalid DTMF signal be detected, thereby preventing use of the telephone to dial unacceptable telephone numbers;
    (f) a DTMF decoder to receive DTMF signals present on the telephone line when the telephone is off-hook, the DTMF decoder producing an output indicative of the respective coded digit values determined by the decoder for each DTMF signal received; and
    (g) a comparator, responsive to the output of the DTMF decoder, for comparing each of the coded digit values of the DTMF signals to preselected and acceptable digit values, wherein if only acceptable digit values are received by the comparator, the filter means is not coupled to the telephone line and an outgoing call can be placed, said acceptable coded digit values include at least one of:
        (i) nine and one; and
        (ii) a plurality of digit values corresponding to a preselected, known telephone number.

2. The apparatus according to claim 1 wherein the means for operatively coupling the apparatus to the telephone line includes:
    (a) a plug;

(b) mechanical means to enable the plug to be plugged into an outgoing telephone jack to couple the apparatus to the outgoing telephone line and to be secured therein to prevent the unauthorized removal of the apparatus from the telephone jack.

3. The apparatus according to claim 2 further comprising:
   (a) a key operated lock having a locked position and an unlocked position; and
   (b) mechanical means responsive to the key operated lock, the mechanical means provided for enabling the apparatus to be removed from the telephone jack of the outgoing telephone line when in the unlocked position and preventing the removal of the apparatus from the telephone jack when in the locked position.

4. An apparatus for providing controlled access to an outgoing telephone line accessed by way of an electro-mechanical telephone jack, the apparatus configured to enable only incoming calls to be answered and outgoing emergency calls to be placed when the apparatus is placed in a locked mode, and the apparatus further configured to enable uncontrolled access to the telephone when placed in the locked mode, the apparatus comprising:
   (a) a plug for operatively coupling the apparatus to the telephone line by plugging the plug into the telephone jack;
   (b) at least one controlled telephone jack, each controlled telephone jack supporting the coupling of at least one telephone to the apparatus;
   (c) a low pass filter operably coupleable to the telephone line for reducing the level of signals present on the telephone line below a useful level;
   (d) a ring detector for detecting a ring signal voltage on the telephone line, the ring detector inhibiting the coupling of the filter to the telephone line should the telephone be taken off-hook within a predetermined time interval after the detecting of the ring signal voltage;
   (e) a DTMF decoder to receive DTMF signals present on the telephone line when the telephone is off-hook, the decoder producing an output indicative of the respective coded digit values determined by the decoder for each DTMF signal received;
   (f) a comparator, responsive to the output of the decoder, for comparing each of the coded digit values of the DTMF signals to preselected and acceptable digit values, said acceptable digit values including a one and a zero;
   (g) control circuitry, responsive to the ring detector and the comparator, for determining when the telephone is taken off-hook in the absence of the ring signal for causing the filter to be coupled to the telephone line in the event an invalid DTMF signal is detected, the control circuitry thereby preventing use of the telephone to dial unacceptable telephone numbers; and
   (h) mechanical means to enable the apparatus to be plugged into the telephone jack of the outgoing telephone line and secured therein to prevent the unauthorized removal of the apparatus from the telephone jack of the outgoing line.

5. The apparatus according to claim 4 further including a coupler to couple and make available to the DTMF decoder the DTMF signals present on the telephone line.

6. The apparatus according to claim 5 wherein the mechanical means includes:
   (a) a key operated lock having a locked position and an unlocked position, the apparatus being placed in the locked mode when the key operated lock is in the locked position and the apparatus being placed in the unlocked mode when the key operated lock is in the unlocked position; and
   (b) means responsive to the key operated lock for enabling the apparatus to be removed from the telephone jack of the outgoing telephone line when the key operated lock is in the unlocked position and preventing the removal of the apparatus from the jack when in the key operated lock is in the locked position.

7. The apparatus according to claim 6 wherein the means responsive to the key operated lock includes retaining means provided in combination by the telephone jack of the outgoing line and the plug of the apparatus.

8. The apparatus according to claim 7, wherein:
   (a) the telephone jack is arranged with a tab; and
   (b) the retaining means comprises a resilient arm to abut the tab, retaining the plug in the telephone jack; and
   (c) a stop which is placed in an appropriate position to prevent movement of the resilient arm when the key operated lock is in the locked position.

9. The apparatus according to claim 5, wherein the filter comprises:
   (a) a series resistor; and
   (b) a shunt capacitor;
   (c) the combination of the series resistor and the shunt capacitor forming the low pass filter when coupled to the telephone line.

10. An apparatus for controlling access to an outgoing telephone line accessed by way of a first telephone jack, the apparatus comprising:
    (a) a plug arranged to plug into the telephone jack for operatively and mechanically coupling the apparatus to the telephone line;
    (b) a pair of circuit lines coupled to the plug, the circuit lines arranged to conduct telephone line signals;
    (c) filter means operably coupleable to the circuit lines for reducing the level of one or more signals present on the circuit lines below a useful level;
    (d) at least one controlled telephone jack connected to the circuit lines, each controlled telephone jack supporting the coupling of at least one telephone to the circuit lines;
    (e) a first switch arranged to operatively couple the filter means to the circuit lines;
    (f) gate means for sensing a reduced voltage level produced between the circuit lines by an off-hook condition of the telephone, the gate means having an output of a first level for an off-hook condition of the telephone and a second level for an on-hook condition of the telephone;
    (g) means, responsive to the gate means, for closing the first switch, thereby coupling the filter means to the circuit lines and preventing operation of at least one telephone connected to the circuit lines through at least one controlled telephone jack;
    (h) a ring detector for detecting a ring signal voltage present on the outgoing telephone line and coupled to the circuit lines when a ring signal occurs thereon; and
    (i) flip flop means, responsive to said ring detector, for latching the output of said gate means thereby preventing said gate means from responding to the reduced voltage level during the presence of the ring signal, the telephone thus remaining operable for use when placed in an off-hook condition during the occurrence of the ring signal voltage.

11. The apparatus according to claim 10 wherein coupling the filter means to the circuit lines prevents the proper operation of all telephones coupled to the apparatus via the controlled jacks.

12. The apparatus according to claim 10 further including:
   (a) a DTMF decoder to receive DTMF signals present on the telephone line when the telephone is off-hook, the DTMF decoder producing an output indicative of the respective coded digit values determined by the decoder for each DTMF signal received; and
   (b) a comparator, responsive to the output of the DTMF decoder, for comparing each of the coded digit values of the DTMF signals to preselected and acceptable digit values;
   (c) the apparatus arranged so that if only acceptable digit values are received by the comparator, the filter means is not coupled to the telephone line and an outgoing call can be placed.

13. The apparatus according to claim 4 further including a coupler to couple and make available to the DTMF decoder the DTMF signals present on the telephone line.

14. The apparatus according to claim 12 further comprising a relay, wherein the relay includes:
   (a) the first switch; and
   (b) a coil;
   (c) the coil operable to actuate the first switch, which is a normally open switch, to place the first switch in a closed position resulting in the coupling the filter means to the circuit lines.

15. The apparatus according to claim 14 further including:
   (a) a second switch having an open position and a closed position; and
   (b) actuating means arranged in a series configuration with the coil and the second switch;
   (c) the actuating means operable to energize the coil and close the first switch only if the second switch is in the closed position, and prevented from energizing the coil if the second switch is in the open position.

16. The apparatus according to claim 15 further including:
   (a) a key operated lock having a locked position and an unlocked position; and
   (b) mechanical means, responsive to the key operated lock;
   (c) the mechanical means provided for placing the second switch in the open position when the key operated lock in the unlocked position and placing the second switch in the closed position when the key operated lock in the locked position.

17. The apparatus according to claim 16 further including means responsive to the key operated lock for enabling the apparatus to be removed from the telephone jack of the outgoing telephone line when in the key operated lock is in the unlocked position and preventing the removal of the apparatus from the jack when in the key operated lock is in the locked position.

* * * * *